US010786129B1

(12) United States Patent
Ebrahimi Afrouzi et al.

(10) Patent No.: US 10,786,129 B1
(45) Date of Patent: Sep. 29, 2020

(54) RECHARGE STATION WITH EXTENDABLE PRONGS FOR MOBILE ROBOT

(71) Applicants: Ali Ebrahimi Afrouzi, San Jose, CA (US); Shahin Fathi Djalali, San Francisco, CA (US)

(72) Inventors: Ali Ebrahimi Afrouzi, San Jose, CA (US); Shahin Fathi Djalali, San Francisco, CA (US)

( * ) Notice: Subject to any disclaimer, the term of this patent is extended or adjusted under 35 U.S.C. 154(b) by 388 days.

(21) Appl. No.: 15/706,523

(22) Filed: Sep. 15, 2017

(51) Int. Cl.
*H01M 10/44* (2006.01)
*H01M 10/46* (2006.01)
*A47L 9/28* (2006.01)
*H02J 7/00* (2006.01)
*G05D 1/02* (2020.01)

(52) U.S. Cl.
CPC ........... *A47L 9/2873* (2013.01); *A47L 9/2826* (2013.01); *A47L 9/2884* (2013.01); *G05D 1/0225* (2013.01); *H02J 7/0045* (2013.01); *A47L 2201/022* (2013.01); *G05D 2201/0215* (2013.01)

(58) Field of Classification Search
CPC ...... H02J 7/0021; H02J 7/0026; H02J 7/0027; H02J 7/355; H02J 7/0042
USPC .......................... 320/104, 109, 111, 114, 115
See application file for complete search history.

(56) References Cited

U.S. PATENT DOCUMENTS

| | | |
|---|---|---|
| 4,777,416 A | 10/1988 | George, II et al. |
| 6,525,509 B1 | 2/2003 | Petersson et al. |
| 7,332,890 B2 | 2/2008 | Cohen et al. |
| 8,106,626 B2 | 1/2012 | Li et al. |
| 8,390,251 B2 | 3/2013 | Cohen et al. |
| 8,868,939 B2 * | 10/2014 | Matsuoka ................. G06F 1/26 320/107 |
| 9,178,370 B2 | 11/2015 | Henricksen et al. |
| 9,215,957 B2 | 12/2015 | Cohen et al. |
| 9,266,440 B2 * | 2/2016 | Gao ......................... B25J 9/042 |
| 2009/0315501 A1 * | 12/2009 | Li ......................... A01D 34/008 318/568.12 |
| 2014/0203764 A1 * | 7/2014 | Ireland .................. H02J 7/0042 320/107 |
| 2014/0217977 A1 * | 8/2014 | Pastoor ............... B60L 11/1833 320/109 |
| 2014/0360832 A1 * | 12/2014 | Aldrich .................. H02G 11/02 191/12.2 R |
| 2015/0364882 A1 * | 12/2015 | Roy ..................... H01R 13/434 439/131 |

FOREIGN PATENT DOCUMENTS

WO   WO-2005074362 A2    8/2005

OTHER PUBLICATIONS

Translation of WO-2005074362 (Aug. 18, 2005) (Year: 2005).*

* cited by examiner

*Primary Examiner* — Edward Tso

(57) ABSTRACT

A charging station for a mobile robotic vacuum using a folding dual prong system to recharge the battery of a mobile robotic vacuum. The electrical connector node contacts which charge the mobile robotic vacuum are placed on these dual prongs. The prongs extend outward from the charging station when charging is required for the mobile robotic vacuum's battery. When not charging, the prongs are retracted back into the charging station in order to protect the prongs and the electrical charging nodes.

17 Claims, 5 Drawing Sheets

US 10,786,129 B1

RECHARGE STATION WITH EXTENDABLE PRONGS FOR MOBILE ROBOT

FIELD OF THE INVENTION

This invention relates to a charging station for a mobile robot, and more particularly, to a charging station with folding prongs on which electrical connector nodes are disposed.

BACKGROUND OF INVENTION

Various types of mobile robots are used in home and commercial settings to carry out routine tasks like vacuuming, mopping, and polishing floors. Charging stations for mobile robotic vacuums are known and prevalent in the prior art. A mobile robotic vacuum contains a rechargeable battery that must be periodically recharged. When charging is required, the mobile robotic vacuum's battery is recharged at the charging station. These charging stations have electrical connector nodes which the mobile robotic vacuum uses to connect to the charging station to recharge the battery. When the mobile robotic vacuum is out for cleaning, these electrical connector nodes remain out and exposed. These electrical charging nodes can be stepped or tripped on and be damaged. It is desirable that an invention be introduced whereby the electrical connector nodes are safely stored within the charging station when the robotic vacuum cleaner's battery does not require charging. This invention introduces a charging station with folding prongs on which electrical charging nodes are disposed. The folding prongs extend outwards for recharging of the mobile robotic vacuum's battery and are stored inside the charging station when the mobile robotic vacuum's battery does not require recharging.

SUMMARY

It is a goal of the present invention to provide a charging station for mobile robots.

It is a goal of the present invention to provide a method to safely store and retrieve electrical connector nodes of a charging station used for charging a mobile robot.

The aforementioned goals are achieved through the design of a charging station comprising electrical charging nodes positioned on extendable prongs that extend outwards when charging of a mobile robot's battery is required and retract for storage inside the charging station when the battery does not require charging.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention presents a charging station with extendable prongs for recharging of a battery of a mobile robotic vacuum.

In some embodiments, the charging station has two folding prongs, each with an electrical connector node position at an end of the respective prong. The prongs extend when the robot is in charging mode. Each prong extends by rotating 90 degrees around a pivot. When the prongs are extended, the electrical connector nodes are align with respective electrical connectors nodes positioned on a bottom of the robot as the robot moves toward the charging station.

When the mobile robotic vacuum approaches the charging station, the extendable prongs extend from the charging station. Once extended, the mobile robotic vacuum connects with the extendable prongs in order to charge.

Once charging of the battery of the mobile robotic vacuum is finished and the mobile robotic vacuum is in work mode and not connected to the charging station anymore, the extendable prongs retract back into the casing of the charging station.

Figure 1A:
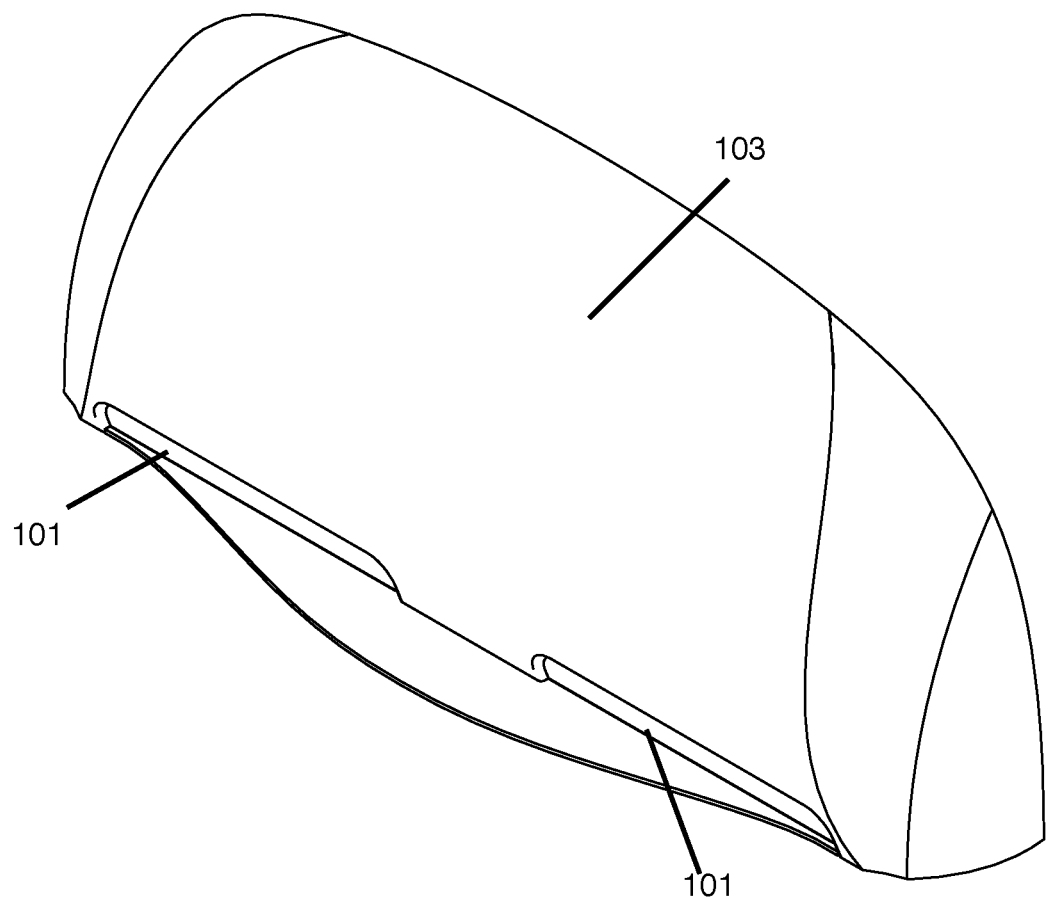
FIG. 1A is a front-right-side view of the charging station with the extendable prongs stored inside.

FIG. 1A illustrates a front-right-side view of the charging station with a casing 103 and the extendable prongs 101 stored within the casing 103.

Figure 1B:
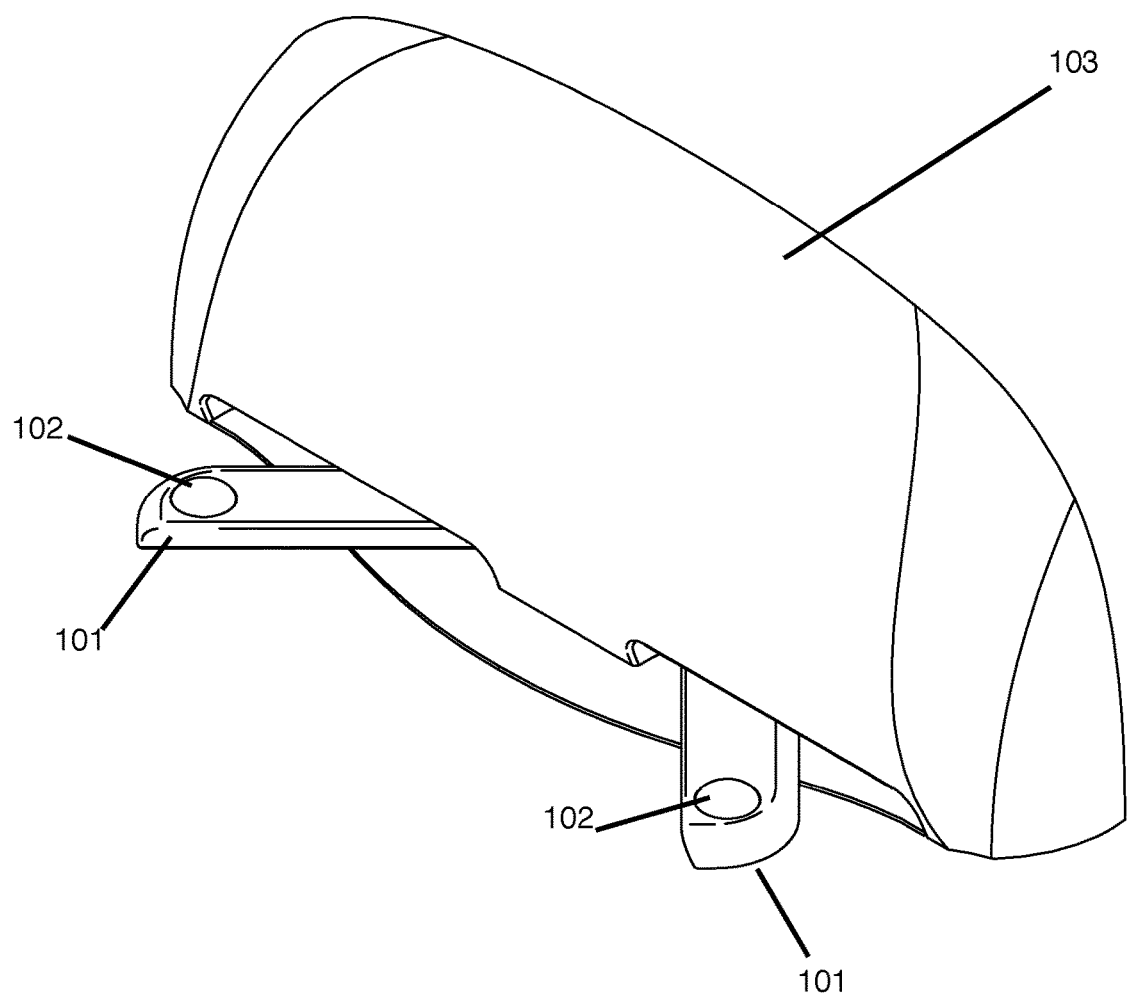
FIG. 1B is a front-right-side view of the charging station with the extendable prongs extended partially in between the stored position and the fully extended position.

FIG. 1B illustrates a front-right-side view of the charging station with the casing 103 and the extendable prongs 101 extended partially in between the stored position and the fully extended position. Electrical connector nodes 102 are positioned at the ends of the prongs 101.

Figure 1C:
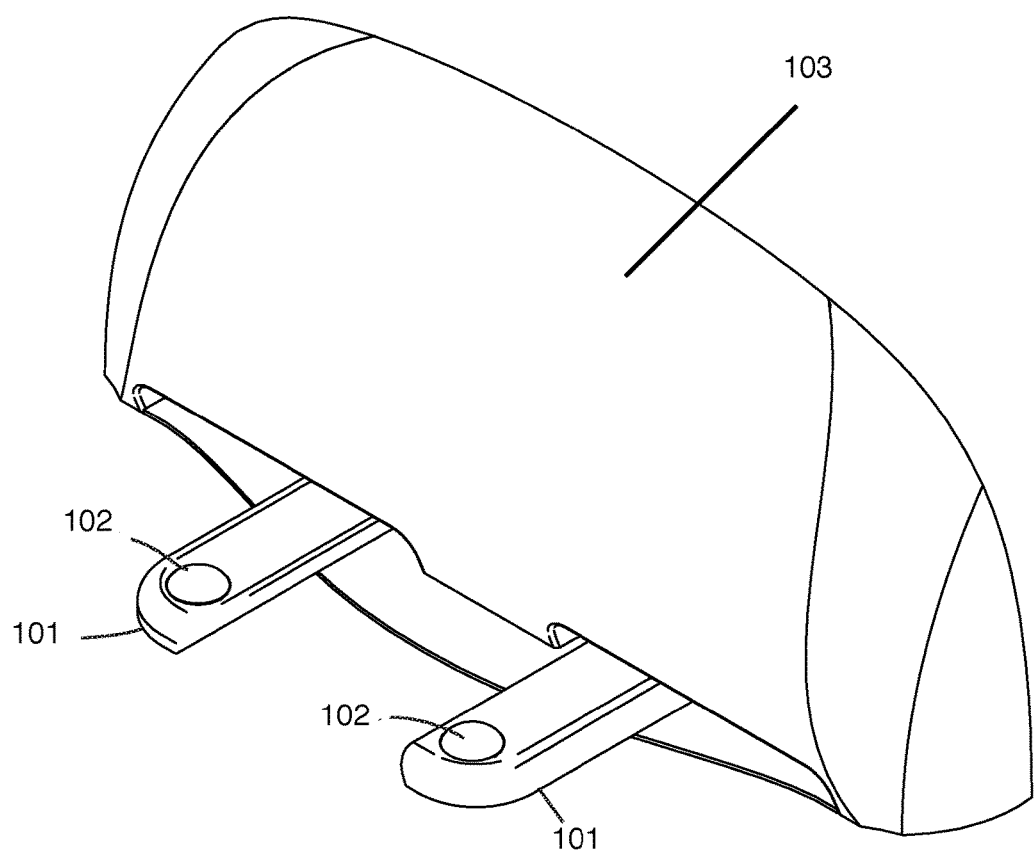
FIG. 1C is a front-right-side view of the charging station with the extendable prongs in the fully extended position.

FIG. 1C illustrates a front-right-side view of the charging station with the casing 103 and the extendable prongs 101 in the fully extended position.

Figure 2A:
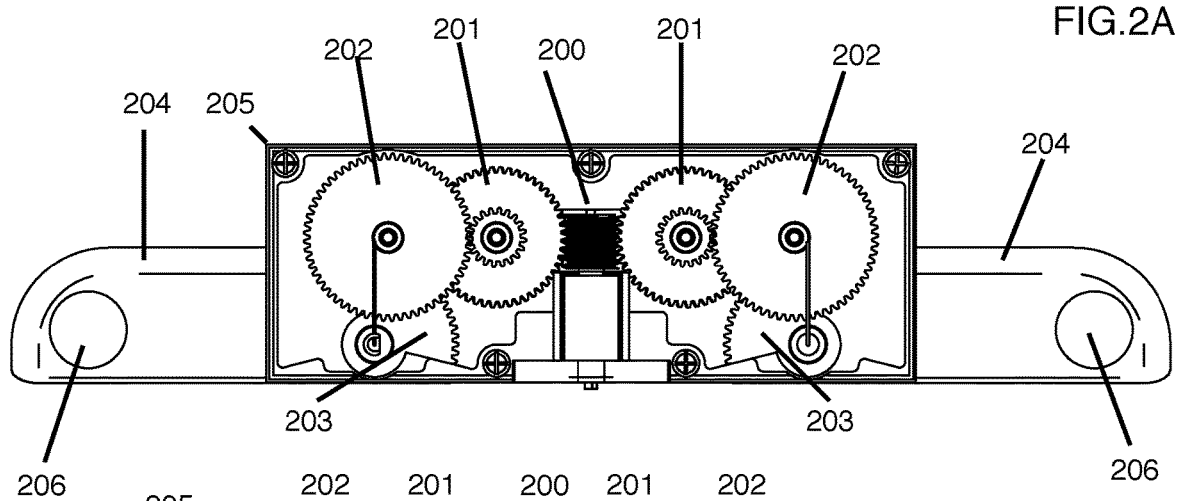
FIG. 2A illustrates an overhead view of the internal mechanics of the charging station's gearbox with the extendable prongs in the stored position.

FIG. 2A illustrates an overhead view of a possible internal mechanism of the charging station. An internal gearbox 205 manages the movement of the extendable prongs 204. In this illustration, the extendable prongs are in the stored position. The extendable prongs 204 each have an electrical connector node 206 positioned on a terminal end. Rotation of the extendable prongs 204 is achieved by a gear mechanism stored within the gearbox 205. A worm 200 is press fit onto a motor shaft such that the worm 200 rotates when the motor is running. The worm 200 meshes with worm gears 201, the worm gears 201 each mesh with a third gear 202, and each third gear 202 meshes with a prong gear 203. The third gears 202 and the walls of the gear box 205 are used as mechanical stops so that prong gears 203 cannot rotate further than desired. The extrusions extruding from prong gears 203 fit into respective slots on the prongs 204, allowing prong gears 203 to control the orientation of the prongs 204. The worm gear 200 causes the prongs 204 to rotate in opposite directions.

Figure 2B:
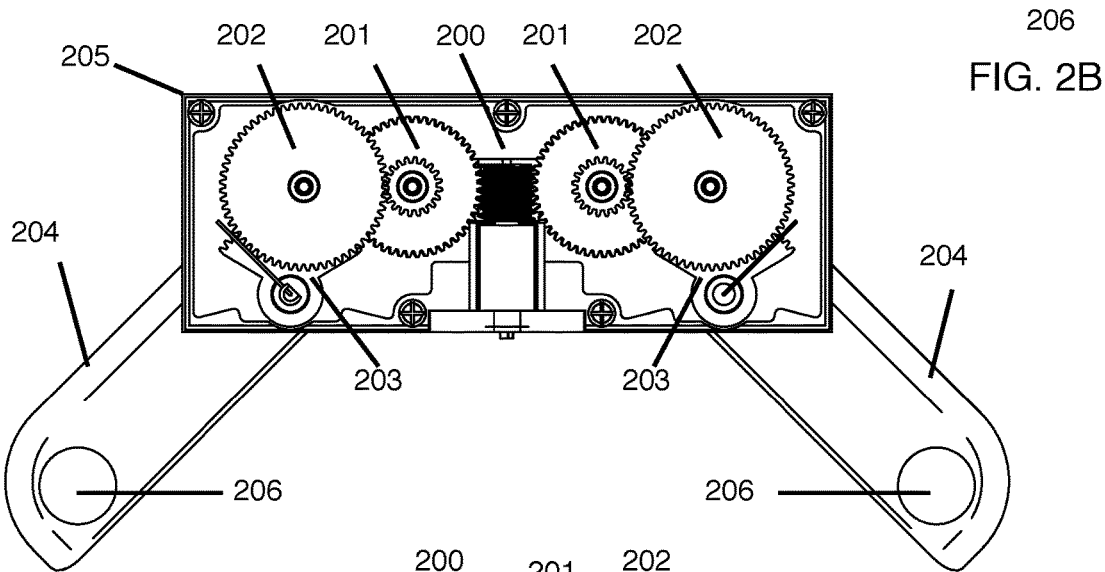
FIG. 2B illustrates an overhead view of the internal mechanics of the charging station's gearbox with the extendable prongs in a partially extended position between the stored and fully extended positions.

FIG. 2B illustrates the same internal mechanism of the charging station illustrated in FIG. 2A, however, the extendable prongs 204 are in the partially extended position in between the stored position and the fully extended position.

Figure 2C:
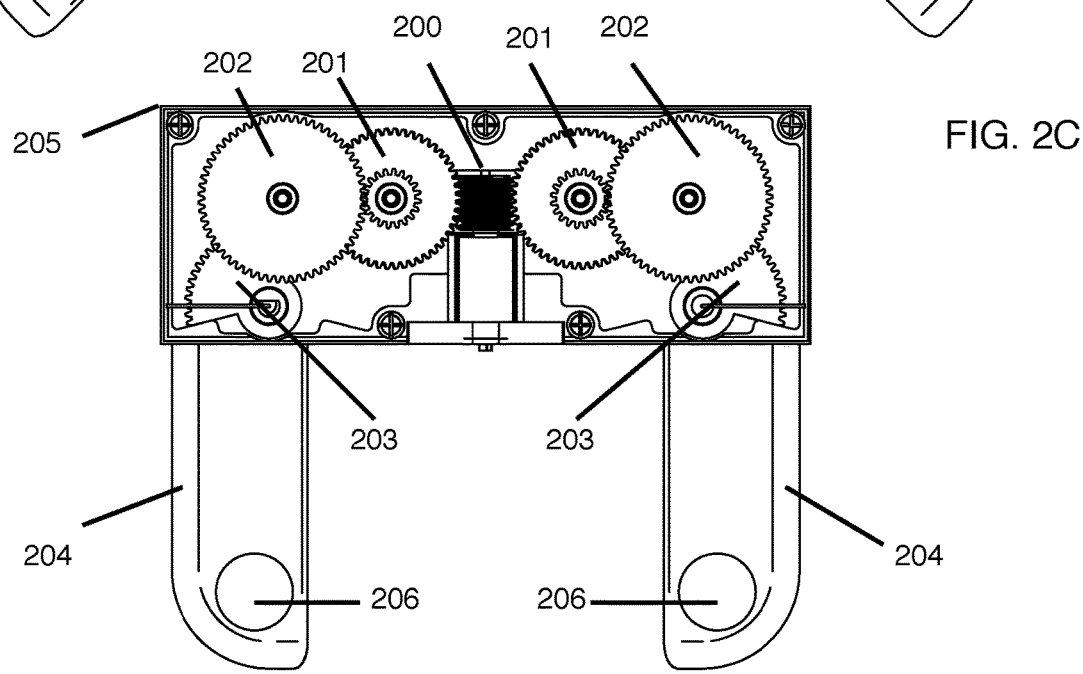
FIG. 2C illustrates an overhead view of the internal mechanics of the charging station's gearbox with the extendable prongs in the fully extended position.

FIG. 2C illustrates the same possible internal mechanism of the charging station illustrated in FIGS. 2A and 2B, however, the extendable prongs 204 are in the fully extended position.

Figures 3A, 3B, 3C:
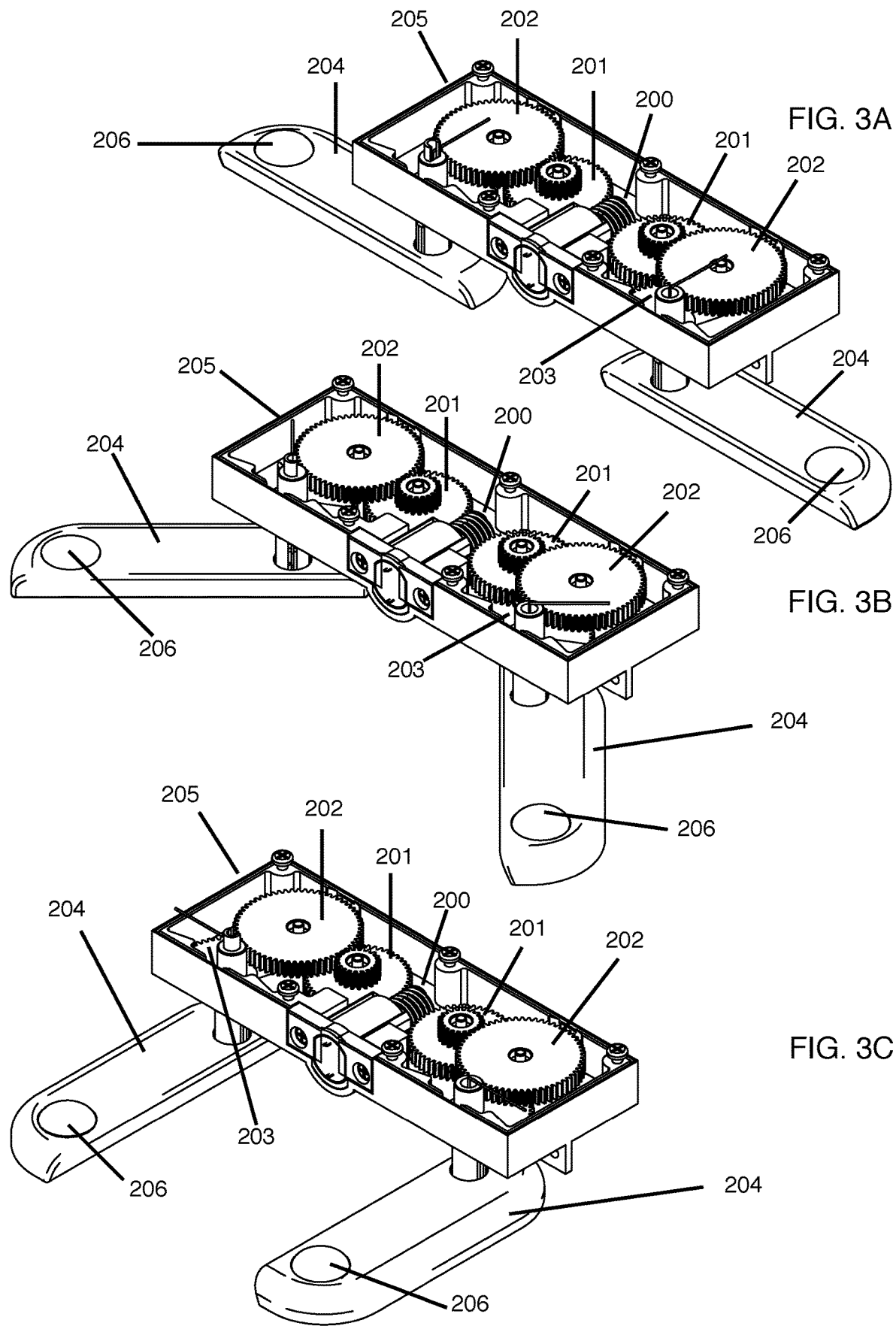
FIG. 3A illustrates an overhead-right-side view of the internal mechanics of the charging station's gearbox with the extendable prongs in the stored position.
FIG. 3B Illustrates an overhead-right-side view of the internal mechanics of the charging station's gearbox with the extendable prongs in a partially extended position between the stored and fully extended positions.
FIG. 3C illustrates an overhead-right-side view of the internal mechanics of the charging station's gearbox with the extendable prongs in the fully extended position.

FIG. 3A illustrates an overhead-right-side view of a possible internal mechanism of the charging station. An internal gearbox 205 manages the movement of the extendable prongs 204. In this illustration, the extendable prongs are in the stored position. The extendable prongs 204 each have an electrical connector node 206 positioned on a terminal end. Rotation of the extendable prongs 204 is achieved by a gear mechanism stored within the gearbox 205. A worm 200 is press fit onto a motor shaft such that the worm 200 rotates when the motor is running. The worm 200 meshes with worm gears 201, the worm gears 201 each mesh with a third gear 202, and each third gear 202 one meshes with a prong gear 203. The third gears 202 and the walls of the gear box 205 are used as mechanical stops so that prong gears 203 cannot rotate further than desired. The extrusions extruding from prong gears 203 fit into respective slots on the prongs 204, allowing prong gears 203 to control the orientation of the prongs 204. The worm gear 200 causes the prongs 204 to rotate in opposite directions.

FIG. 3B illustrates an overhead-right-side view of the same possible internal mechanism of the charging station illustrated in FIG. 3A, however, the extendable prongs are in the partially extended position in between the stored position and fully extended position.

FIG. 3C illustrates an overhead-right-side view of the same possible internal mechanism of the charging station illustrated in FIGS. 3A and 3B, however, the extendable prongs are in the fully extended position.

In one embodiment, the prongs extend outwards upon the detection of the mobile robotic vacuum.

In another embodiment, the prongs extend outwards for a predetermined amount of time upon the detection of the mobile robotic vacuum.

In another embodiment, electrical power is provided to the electrical connector nodes which is transferred to the battery of the mobile robotic vacuum.

In another embodiment, a user or operator of the mobile robotic vacuum commands the prongs to extend or retract.

In other exemplary embodiments, the extendable prongs may be extended outwards from the charging station in various other configurations. For instance, the charging prongs may extend downwards when charging is required and be retracted upwards back into the charging station when not in charging mode.

The foregoing descriptions of the invention have been presented for purposes of illustration and description. They are not intended to be exhaustive and/or to limit the invention to the precise forms disclosed. Obviously, many modifications and variations are possible in light of the above teaching.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

We claim:

1. A charging station for a mobile robotic vacuum comprising:
   a housing;
   two extendable prongs that extend outward from the housing for a charging mode and retract back into the housing when not in a charging mode;
   two electrical connector node contacts positioned on the prongs; and
   a gearbox containing mechanisms for controlling the extension and retraction of the prongs, wherein:
      the prongs extend from the housing for the charging mode and retract back into the housing when not in the charging mode by rotating 90 degrees around a pivot,
      the prongs extend outwards from the housing upon detection of an approaching mobile robotic vacuum, and
      the prongs retract back into the housing when the mobile robotic vacuum leaves the charging station.

2. The charging station of claim 1 wherein the prongs extend outwards from the housing upon the user's command.

3. The charging station of claim 1 wherein the prongs retract back into the housing upon the user's command.

4. The charging station of claim 1 wherein the prongs retract back into the housing when the charging of the mobile robotic vacuum's battery has completed.

5. The charging station of claim 1 wherein the prongs extend outward for a predetermined amount of time.

6. The charging station of claim 2 wherein the prongs extend outward for a predetermined amount of time.

7. The charging station of claim 1 wherein, activation of the gearbox comprises a motor rotating a worm, the worm meshing with a worm gear, the worm gear meshing with a third gear, the third gear activating a prong gear, and the prong gear activating the extension and retraction of the prongs.

8. The method of claim 1 wherein two electrical connector node contacts positioned on the mobile robotic vacuum connect with the two electrical connector node contacts of the prongs to charge a battery of the mobile robotic vacuum.

9. A method of charging a mobile robotic vacuum comprising:
   detecting by a charging station an approaching mobile robotic vacuum,
   transforming the charging station into a charging mode upon detecting the approaching mobile robotic vacuum,
   in response to the charging mode, extending two extendable prongs outwards from a housing of the charging station,
   connecting electrical connector node contacts positioned on the prongs with respective electrical connector node contacts of the mobile robotic vacuum, charging the mobile robotic vacuum's battery, detecting by the charging station the departing mobile robotic vacuum, transforming the charging station out of the charging mode upon detecting the departing mobile robotic vacuum, and in response to transforming out of the charging mode, retracting the prongs back into the housing of the charging station.

10. The method of claim 9 wherein the prongs extend from the charging station for the charging mode and retract back into the charging station when not in the charging mode by rotating 90 degrees around a pivot.

11. The method of claim 9 wherein the prongs extend outwards from the housing upon the user's command.

12. The method of claim 9 wherein the prongs retract back into the housing upon the user's command.

13. The method of claim 9 wherein the prongs retract back into the housing when the charging of the mobile robotic vacuum's battery has completed.

14. The method of claim 9 wherein the prongs extend outward for a predetermined amount of time.

15. The method of claim 11 wherein the prongs extend outward for a predetermined amount of time.

16. The method of claim 10 wherein, when a motor runs and the gearbox is activated, the prongs extend from the charging station and retract back into the charging station.

17. The method of claim 16 wherein, activation of the gearbox comprises the motor rotating a worm, the worm meshing with a worm gear, the worm gear meshing with a third gear, the third gear activating a prong gear, and the prong gear activating the extension and retraction of the prongs.

* * * * *